US008854002B2

(12) United States Patent
Rich et al.

(10) Patent No.: US 8,854,002 B2
(45) Date of Patent: Oct. 7, 2014

(54) SYSTEM AND METHOD FOR PROGRAMMING RECHARGEABLE BATTERY CHARACTERISTICS

(75) Inventors: David Gerard Rich, Waterloo (CA); Taha Shabbir Husain Sutarwala, Mississauga (CA); Joseph Patino, Miramar, FL (US)

(73) Assignee: Blackberry Limited, Waterloo (CA)

( * ) Notice: Subject to any disclaimer, the term of this patent is extended or adjusted under 35 U.S.C. 154(b) by 339 days.

(21) Appl. No.: 13/278,898

(22) Filed: Oct. 21, 2011

(65) Prior Publication Data

US 2013/0099724 A1    Apr. 25, 2013

(51) Int. Cl.
*H02J 7/00* (2006.01)
*H02J 7/04* (2006.01)

(52) U.S. Cl.
CPC ............ *H02J 7/00* (2013.01); *H02J 7/0077* (2013.01); *H02J 7/0003* (2013.01); *H02J 2007/0037* (2013.01); *H02J 7/0063* (2013.01); H02J 2007/004 (2013.01)
USPC ............................ 320/112; 320/132; 320/152

(58) Field of Classification Search
CPC ...................................................... Y02E 60/12
USPC ........................................................ 320/107
See application file for complete search history.

(56) References Cited

U.S. PATENT DOCUMENTS

| 5,534,765 | A | * | 7/1996 | Kreisinger et al. | 320/106 |
| 5,754,029 | A | * | 5/1998 | Mann et al. | 320/106 |
| 5,920,179 | A | | 7/1999 | Pedicini | |
| 6,337,560 | B1 | | 1/2002 | Kalogeropoulos et al. | |
| 6,417,646 | B1 | | 7/2002 | Huykman et al. | |
| 7,202,635 | B2 | | 4/2007 | Patino et al. | |
| 7,671,567 | B2 | * | 3/2010 | Eberhard et al. | 320/150 |
| 2007/0123304 | A1 | | 5/2007 | Pattenden | |
| 2008/0218126 | A1 | | 9/2008 | Bansal et al. | |
| 2011/0156641 | A1 | | 6/2011 | Kishiyama | |

FOREIGN PATENT DOCUMENTS

| EP | 2149958 A2 | 2/2010 |
| GB | 2219151 A | 11/1989 |

OTHER PUBLICATIONS

Examination Report mailed May 15, 2013, in corresponding European patent application No. 11186099.5.
Lowell, "BatteryCare Displays Detailed Battery Information", downloaded from http://web.archive.org/web/20100428165050/http://lifehacker.com/5334722/batterycare-displays-detailed-battery-information on Apr. 13, 2010.
Apple Inc., "Apple—MacBook Pro—Learn all about the breakthrough battery", downloaded from http://www.apple.com/macbookpro/battery on Aug. 16, 2010.
Examination Report mailed Sep. 16, 2013, in corresponding European patent application No. 11186099.5.
Office Action mailed Aug. 26, 2013, in corresponding Canadian patent application No. 2,792,781.
Extended European Search Report mailed Apr. 4, 2012; in corresponding application No. 11186099.5.

* cited by examiner

*Primary Examiner* — Edward Tso
*Assistant Examiner* — Ahmed Omar
(74) *Attorney, Agent, or Firm* — Novak Druce Connolly Bove + Quigg LLP

(57) ABSTRACT

A method and system for programming rechargeable battery characteristics is provided. The system having: a memory component for storing user profiles; a power management integrated circuit; and a processor for retrieving the user profiles and directing power from the battery to the power management integrated circuit in accordance with the user profiles. The method consists of: determining the type of battery; retrieving user profiles stored in a memory component; and adjusting the battery characteristics according to the user profiles.

9 Claims, 6 Drawing Sheets

SYSTEM AND METHOD FOR PROGRAMMING RECHARGEABLE BATTERY CHARACTERISTICS

FIELD

The present disclosure relates generally to batteries. More particularly, the present disclosure relates to a system and method for programming rechargeable battery characteristics.

BACKGROUND

The popularity of portable electronic devices, such as smart phones, computer tablets and notebook computers, continues to grow and improvements to their functionality are continually being created. These improvements may include new applications or enhancements to existing functionality. As a result, these devices are beginning to use and require greater power in order to be able to provide the improved functionality. For some of these devices which are battery powered, a rechargeable battery is typically used which has to be charged more often as the power consumption of the device is increased due to the new functionality.

BRIEF DESCRIPTION OF THE DRAWINGS

Embodiments of the present disclosure will now be described, by way of example only, with reference to the attached Figures.

DETAILED DESCRIPTION

Figure 1:
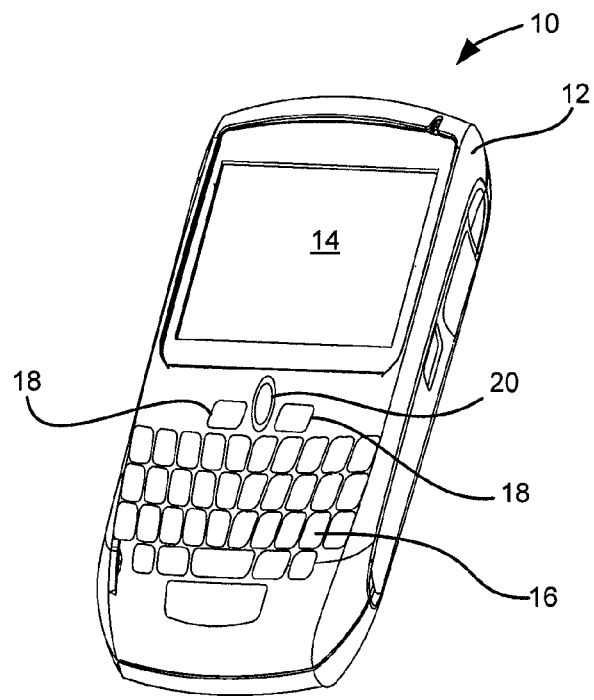
FIG. 1 is a perspective view of a portable electronic device.

In a first aspect, the present disclosure provides a system for programming rechargeable battery characteristics having: a storage component for storing at least one profile record; a power management integrated circuit; and a processor for retrieving the user profiles and directing power from the battery to the power management integrated circuit in accordance with the user profiles.

In a further embodiment, there is provided a method for programming rechargeable battery characteristics comprising: determining the type of battery; retrieving at least one profile record stored in a storage component; monitoring the battery charge level based on characteristics within the profile record; and adjusting the battery characteristics according to the user profiles.

Other aspects and features of the present disclosure will become apparent to those ordinarily skilled in the art upon review of the following description of specific embodiments in conjunction with the accompanying figures.

The use of portable electronic devices is continually growing with new improved technologies and functionalities being introduced on a regular basis. Many of these devices are battery powered and users of these devices may desire that the power source, such as a battery or batteries, provide either greater capacity or longer cycle life. Depending on how a user operates the electronic device or the power consumption of the applications being executed on the device, the user may find that either a battery with greater capacity or a battery with a longer cycle life is more desirable. In other words, if the user tends to use applications or functionality which require high power consumption, the user may desire a battery which has greater capacity. Alternatively, if the user would prefer to have the battery last for a longer period of time before having to be replaced, the user may desire a battery having a longer life expectancy.

By programming the characteristics of the battery, such as its cycle life or its capacity, use of the device may be more suited to the user or owner of the device. Being able to program the characteristics of the rechargeable battery may also be beneficial to battery manufacturers as depending on the programmed characteristics, various battery warranty conditions may be associated with the different characteristics. A lower warranty cost option for the battery may be associated with a lower capacity higher cycle life option versus a higher warranty cost option which is associated with the higher capacity but lower cycle life option.

Generally, the present disclosure provides a system and method for programming rechargeable battery characteristics. The determination of the battery characteristics to be programmed may be based on profile records, which may include information relating to how the user interacts with, or uses, the device. Although the method and system for programming rechargeable battery characteristics are described in terms of a portable electronic device, the same method and system may be used on other battery operated, or powered, electronic devices where users may desire either increased battery capacity or increased battery cycle life. Other portable electronic devices include, but are not limited to, notebook computers, tablet computers, cameras or portable DVD players.

FIG. 1 illustrates a perspective view of a portable electronic device 10 such as a mobile communication device. The portable electronic device 10 has a body 12, which includes a display screen 14, a keyboard/keypad 16, a set of buttons 18 and a trackball 20. It will be understood that the trackball 20 may also be a joystick, scroll wheel, roller wheel, touchpad or the like, or another button. The portable electronic device 10 includes other parts, which are not shown or described. The portable electronic device may be sized such that it may be held or carried in a human hand, so that the device may also be seen as a handheld device.

Figure 2:
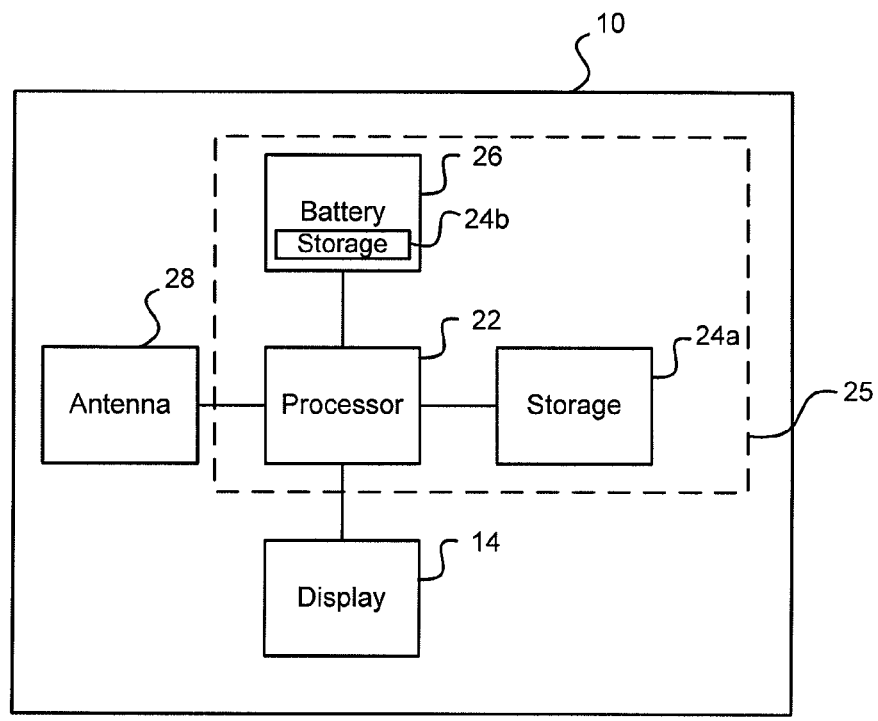
FIG. 2 is a schematic diagram of a portable electronic device, including a system for programming rechargeable battery characteristics.

FIG. 2 is a schematic block diagram of the portable electronic device including a system for programming rechargeable battery characteristics. The system for programming rechargeable battery characteristics 25 includes a processor 22 and a data storage component 24a or memory component. The system 25 is connected to a rechargeable battery 26 for controlling or programming the characteristics of the battery 26. The rechargeable battery 26 may include a data storage, or memory, component 24b.

Figure 3:
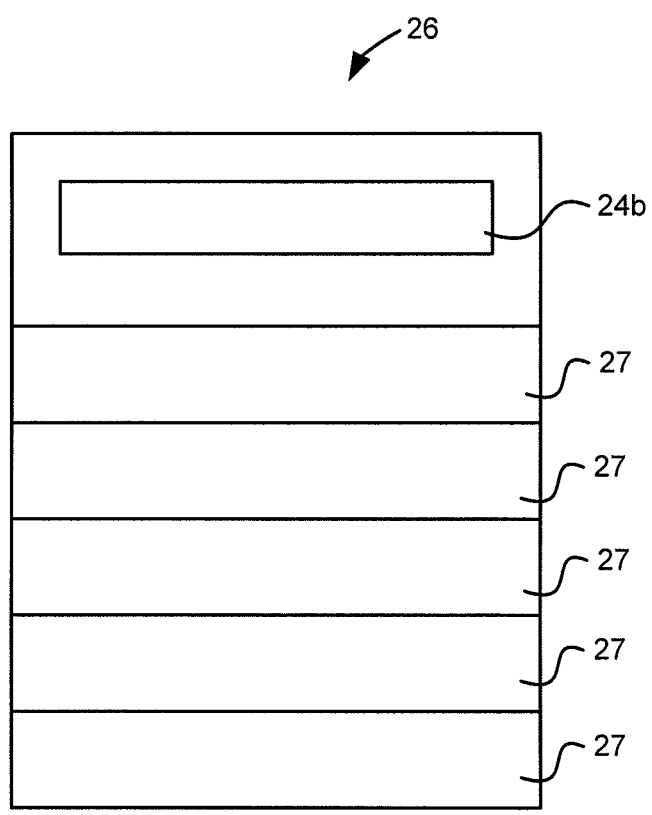
FIG. 3 is a schematic diagram of a battery for use in the portable electronic device.

In one embodiment, the rechargeable battery 26 as shown in FIG. 3 comprises a plurality of individual cells 27 along with the memory component 24b. In the embodiment of FIG. 3, the number of cells equals five, although it will be understood that the battery may include any number of cells. When each cell 27 is fully charged, the battery 26 itself is considered to be fully charged, and as each cell is drained of its power, the power, or charge, level of the battery 26 is reduced.

As the cells are being drained, the battery may be recharged. This recharging process may be affected by certain criteria such as, but not limited to, the speed at which the battery is recharged, or when the battery should be charged, such as at 25% capacity or 50% capacity, or the type of battery. This information or data may be stored as general charging information within the data storage 24a to assist in the programming of the characteristics of the battery in order to provide a battery which corresponds to a user's demand with respect to the battery 26. For instance, some batteries may favour deep cycling.

The system for programming rechargeable battery characteristics 25 interacts with the display 14 via, for example, a connection through a printed circuit board (not shown) or internal cabling or circuitry to display information to the user. In one embodiment, the system for programming battery characteristics 25 may also include the display 14.

The portable electronic device 10 may also include an antenna 28 which is used to access a wireless network to retrieve information for the system 25 or may be used to transmit information to the network.

The processor 22 is also connected to the data storage component 24a, or the data storage component 24a may be a part of the processor 22. The processor 22 may also retrieve information from the data storage component 24b. The storage components 24a, 24b may include both volatile and non-volatile memory, which may store information regarding user preferences and battery characteristics with respect to the capacity, cycle life curve, or allowable voltage range of the battery 26 among other data and information. The processor 22 may process the information stored in the storage components 24a or 24b, or both, and access battery characteristics information or update battery characteristics information. The battery characteristic information and user profiles may be stored in at least one profile record which may detail the preference of cycle life compared to milliamp hour rating and user needs with respect to power consumption or processing needs. Other information may also be stored in the at least one profile records, for example: cycle number of the battery (how many times it has been charged and discharged); frequency of charges; length of charges; time of day (or distribution of times) of charges; length and depth (or distribution of depths) of charges; or average discharge rate.

In operation, the portable electronic device 10 is powered by a power source such as the battery 26. In one embodiment, the battery is a Silver-Zinc battery, which may typically have 40% to 60% more energy in a given volume over a standard Lithium Cobalt battery. Other batteries, with greater energy per given volume over standard Lithium Cobalt batteries may also be used.

Figure 4:
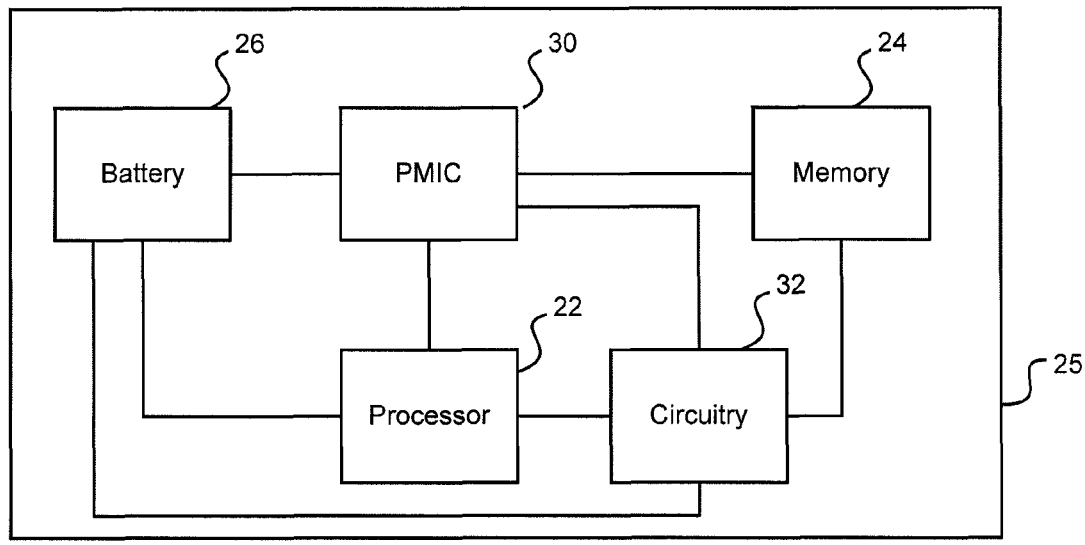
FIG. 4 is a schematic diagram of a system for programming rechargeable battery characteristics according to one embodiment.

A more detailed schematic of the system for programming rechargeable battery characteristics 25 is shown in FIG. 4. The system may further include a power management integrated circuit (PMIC) 30 which, in some embodiments, monitors a maximum charging and minimum discharge allowable voltage range. In one embodiment, the maximum charging and minimum discharge allowable voltage range represents a range that can be handled by the portable electronic device 10.

As some battery types, for example a Silver-Zinc battery, and the like, have increased energy capacity for a given volume compared to a conventional battery, the battery may be able to provide greater power than can be used, or handled, by the portable electronic device 10. Therefore, the PMIC 30 monitors the output of the battery 26 and in combination with circuitry 32 within the portable electronic device, directs how much power is needed. Although the battery may have greater capacity at a given voltage, there may not necessarily be more current being drawn from the battery. This voltage range information may also be stored in one of the data storage components 24 and retrieved by the processor, or may be transmitted to or retrieved by the processor via the antenna 28.

The data storage component 24a of the portable electronic device 10 may also store device information with respect to the distribution of the increased energy to the PMIC 30. The device information may alternatively be programmed and stored within the data storage component 24b of the battery and be used to control a PMIC within the battery 26 or the PMIC 30 of the portable electronic device 10.

In some embodiments, the PMIC 30 is operatively connected with the data storage component 24a and the processor 22 via circuitry 32.

If the system for programming a rechargeable battery 25 monitors the maximum charge and minimum discharge allowable voltage range, sensors and actuators may be included within the circuitry 32. The sensors and actuators are intended to protect the battery from charging or discharging beyond the desired ranges, which is explained in further detail below.

Figure 5:
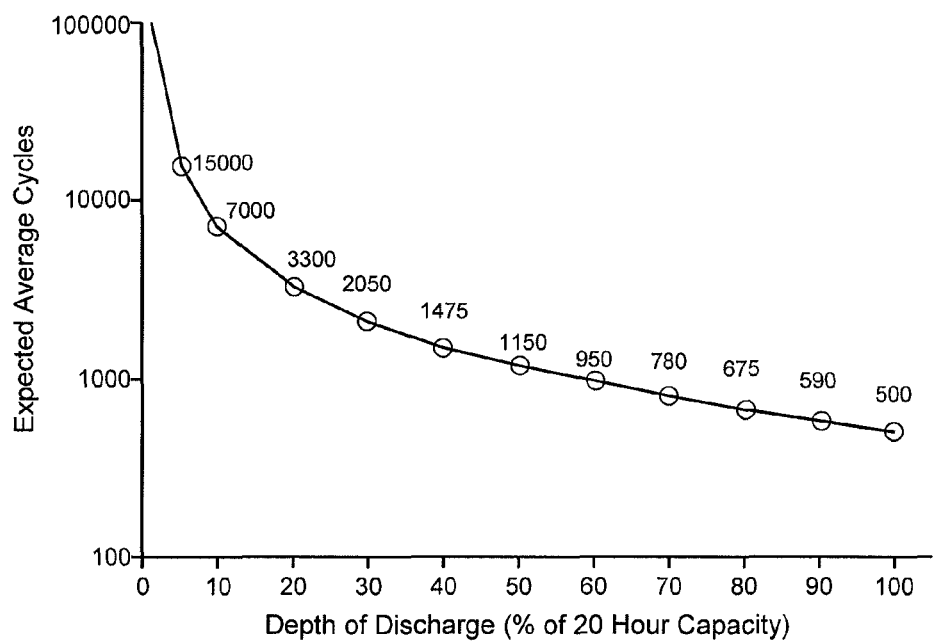
FIG. 5 is a graph showing expected average cycles for a depth of discharge.
Figure 6:
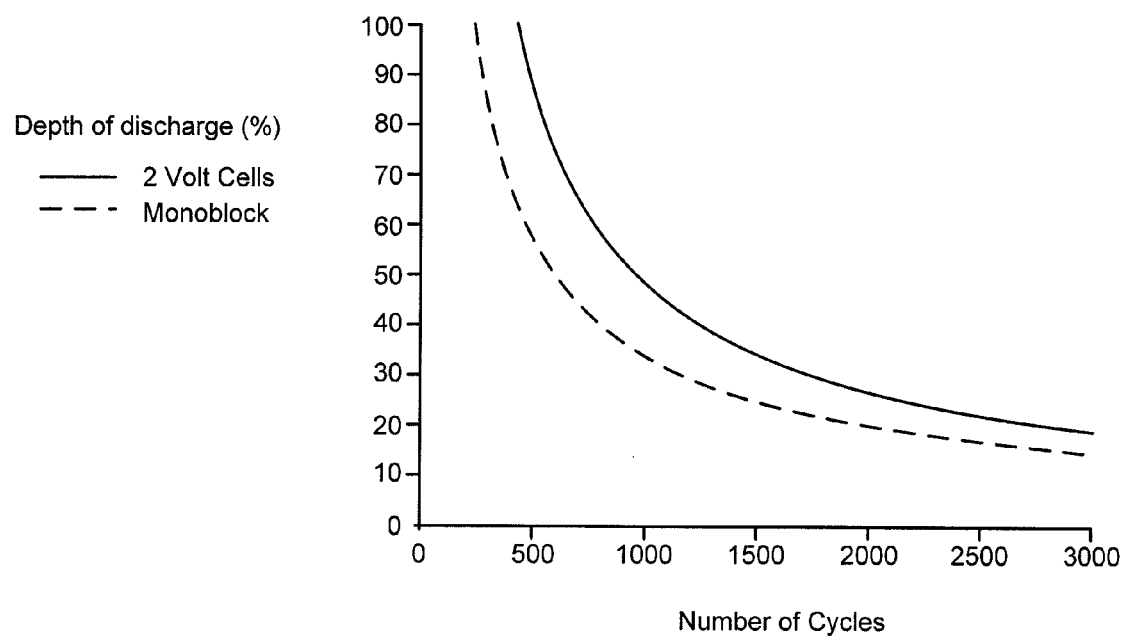
FIG. 6 is a graph showing a depth of discharge percentage per number of cycles for a 2 volt cell and a monoblock battery.

FIGS. 5 and 6 illustrate expected average cycles of a battery compared to a depth of discharge. It can be seen from these figures that as the depth of discharge, or percentage of 20 hour capacity increases, the expected average cycles decreases. For example, if a battery's depth of discharge on average is 100 percent, the battery may only have a cycle life of approximately 500 cycles. On the other hand, as the depth of discharge decreases, the number of cycles of the battery's cycle life can be seen to increase.

In a more specific example, a Silver-Zinc battery having more available energy capacity in a given volume than a typical Lithium Cobalt battery is considered. For a given size, this extra capacity may either be used in its entirety to power the portable electronic device at a higher milliamp hours (mAh) rated level to have a longer run time between chargings or may be used in part to extend the cycle life of the battery 26.

In another example, the higher capacity battery 26 may be a 1500 mAh rated battery and have a cycle life of 300 cycles. However, the battery 26 may be programmed either to run at the full 1500 mAh rating, or may be programmed either through hard coded properties within the at least one profile record, or on the fly based on input from the at least one profile record, to limit the maximum charging or minimum discharge allowable voltage range. This is intended to increase the cycle life, for example an increase from 300 cycles to 500 cycles. The relation between milliamp hour rating and cycle life may vary depending on cell chemistry and architecture and use factors.

Figure 7B:
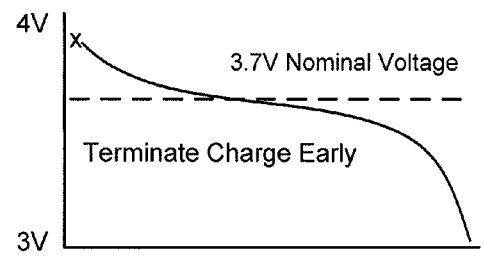
FIGS. 7A to 7D are graphs showing a full charge/discharge cycle, in comparison to a charge, a discharge or both charge and discharge terminated early.
Figure 7A:
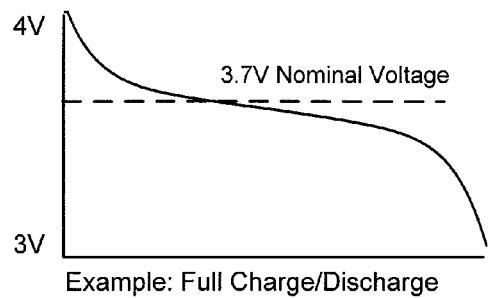
Figure 7C:
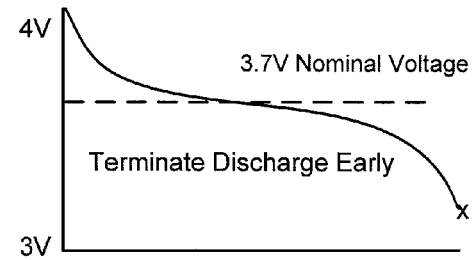
Figure 7D:
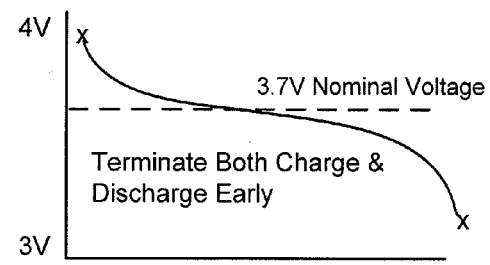

Cycle life may be improved or optimized by limiting the maximum charging voltage, or the minimum discharge voltage or a combination of both, referred to as the charge-discharge range and shown in FIGS. 7A to 7D. FIG. 7A illustrates an example of a full charge and discharge cycle. Using a full charge and discharge cycle, the user may obtain a longer run time during each cycle, but the battery may last fewer cycles. FIG. 7B illustrates a system whereby the charge is terminated early, while FIG. 7C illustrates a system terminating the discharge early and FIG. 7D shows a system with the combination of both the charge and discharge terminated early. By terminating either the charge cycle or discharge cycle early, a user may experience an increase in cycle life of the battery. Terminating both charge and discharge cycles early is intended to further increase the cycle life. Different chemistries and architectures for these batteries may receive more benefit from one method than the other. The voltage requirements of the device the battery is powering, for example the portable electronic device 10, may preclude or favour one method over the others. The charge-discharge range may also be variable and opened up as the cell capacity fades with the charge and discharge voltage range settings. Limiting the maximum charging voltage may have an additional benefit of enabling faster charging by using only charging current (CC) or limiting charging voltage (CV).

Considering the above example, the Silver-Zinc battery may have at least two ways in which to provide the user with the requisite power to power the device. The decision as to how to power the device may be determined by the at least one profile record stored in the data storage component 24a or data storage component 24b.

The user may wish that the portable electronic device 10 use the entirety of the extra capacity to power the electronic device 10 at a higher milliamp hour rated level in order to have an extended run time compared to a conventional battery. In the example where the Silver-Zinc battery contains 40% more available power capacity in a given volume, if the option of using the entirety of the extra capacity is desired, based on the at least one profile record, the battery 26 will amend the 0% or 100% State-Of-Charge (SOC) of the battery 26 to a relative level. For example, the 100% SOC of the Silver-Zinc battery would be modified to make use of the extra 40% energy, in comparison to what would be considered the 100% SOC of a regular or Lithium Cobalt battery. Therefore, if the user wishes to have a higher battery capacity, this relative level may be stored in the at least one profile record and accessed by the system for programming rechargeable battery characteristics 25. The at least one profile record may be programmed into the storage component 24b of the battery 26 or may be stored within the storage component 24a of the portable electronic device 10. Although the user would still be shown the battery charge level between 0 to 100 percent on the display 14, the system may select how much capacity the 100 percent represents, either through software programming or hard coded. This option is intended to provide the user with longer intervals per battery charge, as a portion or all of the extra capacity may be drawn from the battery during each cycle. In other words, it would take longer for the Silver-Zinc battery to be fully drained of its power than the Lithium-Cobalt battery assuming that both are being operated under identical conditions.

Another option is that the user may desire that the Silver-Zinc battery, or the like, have an increased number of cycles than a conventional battery of similar volume by using a part of the extra capacity to extend the cycle life of the battery. In this case, the system for programming rechargeable battery characteristics 25 will access the allowable voltage range from the battery and may, as shown in FIG. 7, terminate the maximum charge, the minimum discharge or both earlier than a full charge or discharge. The circuitry 32 within the system may receive instructions from the processor 22, based on input from the at least one profile record to determine the allowable voltage range and to ensure that either charging or discharging is interrupted when either the maximum charge, minimum discharge or both is reached. The system for programming rechargeable battery characteristics 25 can draw an amount of energy that is equal to that drawn from a conventional battery, or may, based on input from the at least one profile record, draw more than a conventional battery but less than the full amount available from the battery 26.

In some embodiments, the system for programming rechargeable battery characteristics 25 may monitor and adjust the charge-discharge range when the system for programming rechargeable battery characteristics 25 determines that the amount of power drawn or required has decreased in the current charge-discharge range. If, based on input from the at least one profile record including data related to the voltage supplied in each cycle, it is determined that the range has decreased, the charge and discharge range may be expanded, through the processor 22 updating the range used by the sensors and actuators of the circuitry 32. In a specific example, where the Silver-Zinc battery may have 40% more energy in a given volume than a Lithium Cobalt battery, the at least one profile record may direct the system 25 to set the maximum charge and minimum discharge range equal to that of a conventional battery, for example by terminating both the charge cycle and discharge cycle early. Various techniques may be used to determine the SOC of the battery, for example by determining what battery voltages may be used as the amended 0% and 100% to parallel the range of a conventional battery, or through the use of coulomb counting, by determining the coulomb count of the desired range and limiting the charge-discharge range to the coulomb count. Limiting the charge-discharge range that is accessed is intended to prolong the life of the battery, as reducing the percentage of depth of discharge has been shown to expand the expected average cycles of the battery as shown previously in FIGS. 5 and 6.

In one example, the system for programming battery characteristics 25 determines the accessed charge-discharge range will be a middle range, such as the range shown in FIG. 7D, equating to 100% of the conventional battery, and avoid accessing the high and low ranges, for example by terminating both the maximum charging voltage and minimum discharge voltage early when compared to a full charge/discharge cycle. The system for programming rechargeable battery characteristics 25 can adjust the accessed range, or amend the maximum charging voltage and minimum discharge voltage, during the life of the battery 26, which may extend the life of the battery over the life of the conventional battery when operated at the same power level as the conventional battery. In other words, the system of programming a rechargeable battery 25 may amend the range between the maximum charging voltage and minimum discharge voltage when the system determines the battery cell capacity has faded or reduced. By amending or opening up this charge-discharge range, it is intended that the user will experience comparable cycle length for a longer period of time when compared to a conventional battery operated under identical conditions. For example, if coulomb counting is used, the system may determine that the count previously used is no longer providing a range that is consistent with a conventional battery. The system may wish to increase the coulomb count, thus opening the charge-discharge range which will allow the battery to continue to produce a range similar to a conventional battery. By selecting to end either the maximum charge, minimum discharge or both early, and then having the system slowly open up the range when it determines less voltage is being supplied in the charge-discharge range, it is intended that the usable capacity of the battery is extended.

The at least one profile record, which may be used to determine the battery characteristics, may be specified by monitoring the user's activities on the portable electronic device to determine whether the user would benefit from a higher milliamp hour rated battery or from a battery with an increased cycle life. This monitoring may include determining the processing needs and applications being executed by the user or determining if the full milliamp hour rating is required or if a reduced milliamp hour rating would be acceptable. In some embodiments, the user may have the battery run either on a higher milliamp hour rate for longer run time between charging or select to have increased cycle life.

In other embodiments, the battery may have a profile record pre-programmed by the manufacturer and the user may purchase the battery with the longer run time between charges or the longer life cycle. It may be possible to switch modes during the life cycle of a battery but such a switch may further require parallel cell connections, a switch and a further controller. The voltage range or maximum charge or minimum discharge levels may be adjusted by the system 25 as detailed above, if the adjustment meets the portable electronic device's requirement.

After a battery has been inserted into the portable electronic device and the device becomes operational, the processor 22 retrieves at least one profile record from a storage component 24a or 24b and determines the profile associated with the battery 26 and PMIC 30. Once the at least one profile record has been retrieved, the system 25 can determine to either draw power with a higher milliamp hour rating to increase run time or at a lower milliamp rating to increase the cycle life of the battery 26. In some embodiments of the system for programming battery characteristics, the data storage component may be included as part of the battery or the processor 22 may be able to retrieve the at least one profile record from the data storage component of the battery 26 and direct the power flow and PMIC 30 accordingly. In other cases, the at least one profile record may be stored in the data storage component and may be modified depending on the changing use patterns and user profiles. If the at least one profile record is a pre-programmed record programmed by the manufacturer, the profile record may supersede any profile record or user preference stored in the storage component on the portable electronic device.

Figure 8:
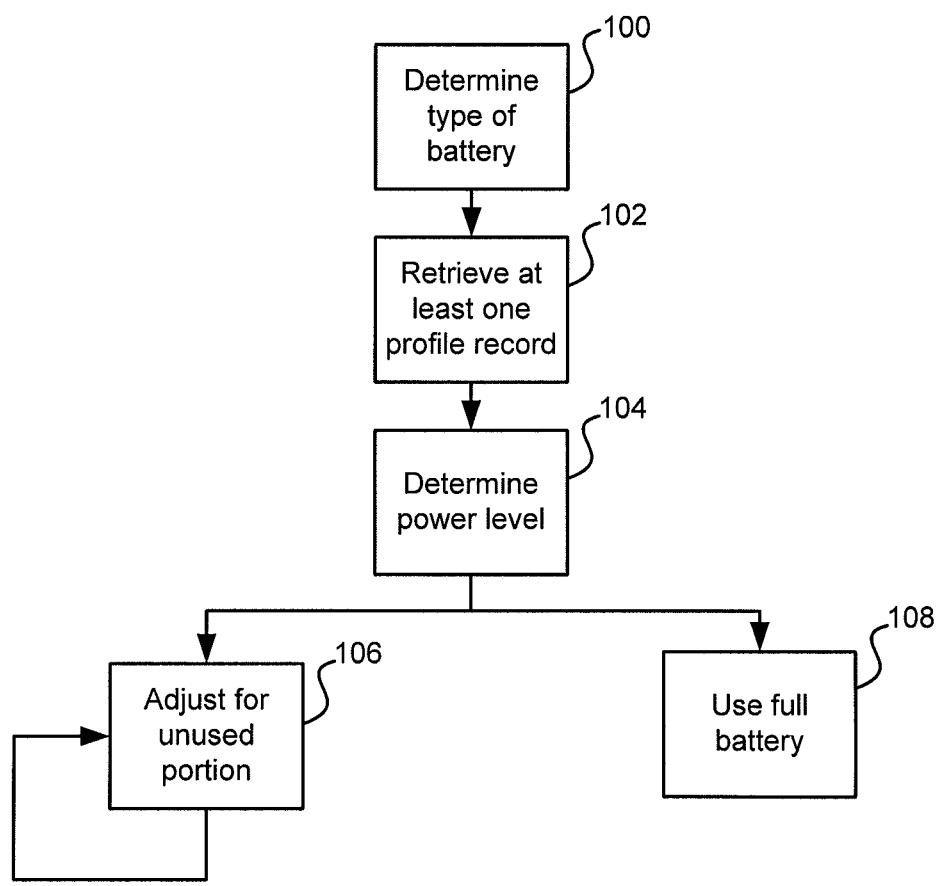
FIG. 8 is a flow chart illustrating a method of programming rechargeable battery characteristics.

FIG. 8 illustrates a method of programming rechargeable battery characteristics according to one embodiment. The system for programming rechargeable battery characteristics determines 100 the type of battery. This information may be retrieved by the processor by accessing the storage component 24b within the battery or this information may be transmitted to the processor when the battery 26 is inserted into the portable electronic device. In another embodiment, in determining the type of battery, the cell chemistry and architecture of the battery may be retrieved as may the condition of the cells within the battery. The system for programming battery characteristics 25 further retrieves 102 at least one profile record stored in the storage component either within the portable electronic device, the battery, or both. The storage component may be part of the processor, may be a discrete component or may be part of the battery. The at least one profile record may include, but is not limited to, information relating to how fast to charge the battery, how long the battery would typically last, for example the estimated total cycle life or estimated remaining cycle life, and how much energy per volume, or the milliamp hour rating to be provided by the battery 26. This information may be based on user requests, may be determined by monitoring how a user has been previously using the device, or may be programmed by the manufacturer.

Once the at least one profile record has been retrieved from the data storage component, the state of charge of the battery is determined 104. To determine the state of charge, the system for programming rechargeable battery characteristics 25 reviews the charge levels of the plurality of cells within the battery. It is intended that the system for programming battery characteristics 25 will review the at least one profile record and power level and determine what milliamp hour rating or charge-discharge range may be required from the battery 26 and required by the PMIC 30.

If the at least one profile record indicates that the user prefers to have a battery with a longer cycle life, the system for programming rechargeable battery characteristics 25 adjusts 106 the charge-discharge range from the battery 26 in order to produce the same power drawn as a conventional battery. The system 25 may either have the circuitry 32 terminate the charging early, the discharging early, or both. The system 25 may continue to monitor the voltage drawn per cycle, and if the system 25 detects that the voltage or power drawn has fallen below that of a conventional battery, the system 25 may adjust or open up the charge-discharge range. The adjustment 106 can be run every cycle or at predetermined time intervals, for example every second, every minute. The system for programming battery characteristics 25 may review the power level drawn from the charge-discharge range and the estimated cycle life, or the condition of the cells and balance the power drawn to meet the requirements programmed in the at least one profile record.

If the at least one profile record determines the user prefers to run the battery at a higher mAh rating level for a longer run time, the system for programming rechargeable battery characteristics 25 may use the full battery capacity 108 to run the battery for a greater length of time at the higher mAh rating compared to the standard Lithium Cobalt battery.

In the preceding description, for purposes of explanation, numerous details are set forth in order to provide a thorough understanding of the embodiments; however, not all these specific details are required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for programming characteristics for a rechargeable battery comprising:

a data storage component for storing at least one profile record, the at least one profile record comprising a desired milliamp hour rating of the rechargeable battery; and a processor for retrieving the at least one profile record and recharging the rechargeable battery based on the at least one profile record;

wherein the at least one profile record is associated with user preferences and the at least one profile record is updated by monitoring use activities to determine a milliamp hour rating of the rechargeable battery;

wherein the user preferences are associated with battery characteristics; and wherein the battery characteristics relate to greater capacity or longer cycle life.

2. The system of claim 1 wherein the storage component is located within the rechargeable battery.

3. The system of claim 1 wherein the at least one user profile includes a maximum charge and minimum discharge range of the rechargeable battery for a desired voltage level.

4. The system of claim 1 wherein the system further comprises circuitry configured to amend the maximum charge and minimum discharge range.

5. The system of claim 2 wherein the at least one profile record is pre-programmed on the rechargeable battery.

6. A method of programming characteristics of a rechargeable battery comprising:

retrieving at least one profile record stored in a storage component, the at least one profile record comprises a desired milliamp hour rating of the rechargeable battery, wherein the at least one profile record is associated with one or more user preferences and the at least one profile record is associated with monitoring use activity to determine a milliamp hour rating of the rechargeable battery; and adjusting battery characteristics according to the at least one profile record;

wherein the user preferences are associated with battery characteristics; and wherein the battery characteristics relate to greater capacity or longer cycle life.

7. The method of claim 6 wherein the at least one profile record is pre-programmed on the rechargeable battery.

8. The method of claim 6 wherein the at least one profile record includes a maximum charge and minimum discharge range of the rechargeable battery.

9. The method of claim 8 further comprising amending the maximum charge and minimum discharge range based on the voltage output of the rechargeable battery.

* * * * *